United States Patent
Nakanishi et al.

(10) Patent No.: US 7,613,097 B2
(45) Date of Patent: Nov. 3, 2009

(54) OPTICAL PICKUP APPARATUS WITH BILATERALLY DIVIDED LIGHT BEAMS

(75) Inventors: Hideyuki Nakanishi, Ohtsu (JP);
Toshihiro Kuroda, Takatsuki (JP);
Kazumasa Nagano, Takatsuki (JP);
Daisuke Furukawa, Takatsuki (JP)

(73) Assignee: Panasonic Corporation, Osaka (JP)

( * ) Notice: Subject to any disclaimer, the term of this patent is extended or adjusted under 35 U.S.C. 154(b) by 565 days.

(21) Appl. No.: 11/275,701

(22) Filed: Jan. 25, 2006

(65) Prior Publication Data

US 2006/0164952 A1 Jul. 27, 2006

(30) Foreign Application Priority Data

Jan. 26, 2005 (JP) .............................. 2005-018884

(51) Int. Cl.
*G11B 7/00* (2006.01)
(52) U.S. Cl. ............................... 369/112.1; 369/44.41
(58) Field of Classification Search ........................ None
See application file for complete search history.

(56) References Cited

U.S. PATENT DOCUMENTS

| | | | | |
|---|---|---|---|---|
| 5,066,138 | A * | 11/1991 | Toide et al. | 369/112.1 |
| 5,638,352 | A * | 6/1997 | Yang | 369/44.23 |
| 5,712,843 | A * | 1/1998 | Chao et al. | 369/112.12 |
| 5,777,976 | A * | 7/1998 | Dang | 369/112.04 |
| 6,072,579 | A * | 6/2000 | Funato | 356/457 |
| 6,084,840 | A * | 7/2000 | Jang | 369/112.12 |
| 6,130,872 | A * | 10/2000 | Sugiura et al. | 369/112.04 |
| 6,646,975 | B1 * | 11/2003 | Uchizaki et al. | 369/121 |
| 6,891,675 | B2 * | 5/2005 | Ohyama | 359/566 |
| 7,139,235 | B2 * | 11/2006 | Nakanishi et al. | 369/112.04 |
| 7,227,819 | B2 * | 6/2007 | Kadowaki et al. | 369/44.41 |
| 2002/0018432 | A1 | 2/2002 | Ohuchida | |
| 2002/0141320 | A1 * | 10/2002 | Hamaoka | 369/112.12 |
| 2004/0027939 | A1 * | 2/2004 | Okada | 369/44.37 |
| 2005/0088948 | A1 | 4/2005 | Ohuchida | |

FOREIGN PATENT DOCUMENTS

| | | |
|---|---|---|
| JP | 10-149571 A | 6/1998 |
| JP | 11-186651 | 7/1999 |
| JP | 2002-123952 A | 4/2002 |
| JP | 2002-123971 A | 4/2002 |
| WO | 2006/054383 | 5/2006 |

OTHER PUBLICATIONS

English language Abstract of JP 2002-123971 A.
English language Abstract of JP 2002-123952 A.
English language Abstract and partial translation of JP 10-149571 A.
English language Abstract of JP 11-186651.

* cited by examiner

*Primary Examiner*—Peter Vincent Agustin
(74) *Attorney, Agent, or Firm*—Greenblum & Bernstein PLC

(57) ABSTRACT

An optical pickup apparatus which carries out recording/reproduction or deletion of information on an optical disc, including a semiconductor laser device in which at least two light sources are integrated, and a hologram optical element which has a plurality of outgoing light areas that divide light reflected from the optical disc, each light being emitted from the semiconductor laser device; the hologram optical element has division lines which divide the outgoing light areas at a position intersecting with each optical axis of the reflected light. The optical pickup apparatus is able to detect a signal corresponding to a light beam divided almost equally in two, even when any one of the plurality of light sources are operating.

7 Claims, 11 Drawing Sheets

PRIOR ART

OPTICAL PICKUP APPARATUS WITH BILATERALLY DIVIDED LIGHT BEAMS

BACKGROUND OF THE INVENTION (1) Field of the Invention

The present invention relates to an optical pickup apparatus, such as an optical disc or an optical card, which records/reproduces or erases information in an optical medium or a magneto-optical medium.

(2) Description of the Related Art

Optical discs are used, as a high-density and large-volume recording medium, in a variety of fields, for storing and distributing not only music but also video and various kinds of data, and the market for optical discs continues to expand.

Within such an optical disc apparatus, a section which serves to retrieve information from an optical disc and record into an optical disc is an optical pickup apparatus. This optical pickup apparatus is generally configured of: a semiconductor laser device, which is a light source; a condenser optical system which condenses a light beam from the semiconductor laser device onto the optical disc; a diverging optical system which diverges a part of the laser beam that is reflected on the optical disc, passes through the condenser optical system, and returns; and a light receiving element, which photo-detects the diverged light beam.

DVD devices, which have spread excessively in recent years, have specifications for reproducing/recording CDs and DVDs. Therefore, a DVD device includes a red semiconductor laser device and an infrared semiconductor laser device as semiconductor laser devices.

Recently, in semiconductor laser devices, use of a dual wavelength laser element, in which two laser elements are integrated into a single package (monolithically or in hybrid; see Patent Reference 1 for an example of monolithic integration), continues to be the future technological trend of optical pickup apparatuses. (Patent Reference 1: Japanese Patent Application No. 11-186651.)

In addition, this technological trend is the same for next-generation optical disc apparatuses that record/reproduce using a blue light source, which are presently continuing to be developed as high-density discs. In other words, an optical pickup apparatus found in a next-generation optical disc apparatus must carry out reproduction/recording of conventional DVDs and CDs. Therefore, red and infrared light sources are needed in addition to a blue light source, and in the future it will be necessary to implement a light source that has integrated the aforementioned light sources into a single device and an optical pickup apparatus that uses that light source.

Because the semiconductor laser device that integrates light sources of a plurality of wavelengths exists with those light sources at a certain distance, an optical axis of each light source differs. However, the optical pickup must detect a servo signal for a tracking servo of that objective lens, or an address signal for detecting an address signal, in order to read/write information in the optical disc.

A generally-used method for obtaining these signals involves: dividing a light beam, which is condensed by the objective lens onto the optical disc, reflected, and captured back into the objective lens, bilaterally on a track line of the optical disc; detecting each of the divisions; and finding the differential.

However, as indicated by FIG. 1, this plurality of light sources is arranged in the bilaterally-divided direction, or, in other words, in the direction perpendicular to the track line of the optical disc. Therefore, the optical axis of the light beam outgoing from the light sources and the optical axis of the reflected light differs with each light source within the optical system, and it is thus difficult to obtain an ideal bilaterally-divided signal with a simple bilaterally-divided optical element. It is possible to obtain an ideal division if a plurality of reflected beams is divided on the intersect of the optical axes. However, there are cases where that intersect is within the lens, or the intersect moves due to tracking movement as a result of a focus servo of the objective lens, and it is not physically possible to construct a means for deriving a bilateral division in a stable manner.

SUMMARY OF THE INVENTION

Accordingly, an object of the present invention is to solve the abovementioned problems by providing an optical pickup apparatus that bilaterally divides beams outgoing from a plurality of light sources in an ideal manner.

To solve the abovementioned problems and achieve the abovementioned object, an optical pickup apparatus according to the present invention is an optical pickup apparatus which performs recording/reproduction or deletion of information on an optical medium, and includes: a light-emitting unit, in which at least two light sources are integrated; and an optical unit that has a plurality of outgoing light areas that divide each light reflected from the optical medium, the light being emitted from each of the light sources. The optical unit has a plurality of division lines that divide the outgoing light areas in positions where optical axes of each reflected light intersect with the optical unit.

In this manner, in the optical pickup apparatus according to the present invention, the outgoing light areas of the optical unit are divided at the position where the optical axes of each reflected light intersect with the optical unit. Through this, it is possible to bilaterally divide each light reflected from the optical medium, the light being light beams emitted from any of the light sources.

Here, the optical unit may be a hologram optical element. With such a configuration, it is possible to configure the optical unit from the hologram optical element.

Here, the optical unit may have a plurality of division lines which divide the light-emitting areas and which are spaced at an interval equal to an interval of the light sources within the light-emitting unit.

With such a configuration, the optical unit has a plurality of division lines which divide the light-emitting areas and which are spaced at an interval equal to an interval of the light sources within the light-emitting unit. Therefore, it is possible to bilaterally divide each light reflected from the optical medium, the light being light beams from any of the light sources within the light-emitting unit, with the optical unit.

Here, the optical pickup apparatus may further include a condensing unit that condenses a light beam from the light-emitting unit, and the optical unit may be located between the light-emitting unit and the condensing unit. With such a configuration, it is possible to set the optical unit between the light-emitting unit and the condensing unit.

Here, the optical unit may be located at a distance of within 3 mm from the light-emitting unit in an optical axis direction of the light-emitting unit. With such a configuration, the optical unit is set within 3 mm in an optical axis direction from the light-emitting unit. Through this, it is possible to raise the accuracy of a signal received by a light receiving unit.

Here, the optical pickup apparatus may further include: a light receiving unit that detects outgoing light from the optical unit; and a diffraction unit that diffracts each light reflected from the optical medium, the light being emitted from each of the light sources, and condenses the diffracted light onto the light receiving unit. The optical unit may have a plurality of division lines that divide the outgoing light areas in positions where optical axes of each reflected light diffracted by the diffraction unit intersect with the optical unit.

With such a configuration, the optical unit has a plurality of division lines that divide the outgoing light areas in positions where optical axes of each reflected light diffracted by the diffraction unit intersect with the optical unit. Therefore, it is possible to bilaterally divide each light reflected from the optical medium, the light being light beams from any of the light sources, with the optical unit.

Here, the optical unit may be located between the light receiving unit and the diffraction unit. With such a configuration, it is possible to set the optical unit between the light receiving unit and the diffracting unit.

Here, the optical unit may be located at a distance of within 3 mm from the light receiving unit in an optical axis direction of the light receiving unit. With such a configuration, the optical unit is set within 3 mm in an optical axis direction from the light receiving unit. Through this, it is possible to raise the accuracy of a signal received by a light receiving unit.

The present invention can detect a desirable bilaterally-divided signal from a light beam from any of the light sources. Therefore, it is possible to provide an optical pickup apparatus which can detect stable servo, address, and other types of signals when any of the light sources is operating.

FURTHER INFORMATION ABOUT TECHNICAL BACKGROUND TO THIS APPLICATION

The disclosure of Japanese Patent Application No. 11-186651 filed on Jul. 9, 1999 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

First Embodiment

First, an optical pickup device according to the first embodiment of the present invention is described.

Figure 1:
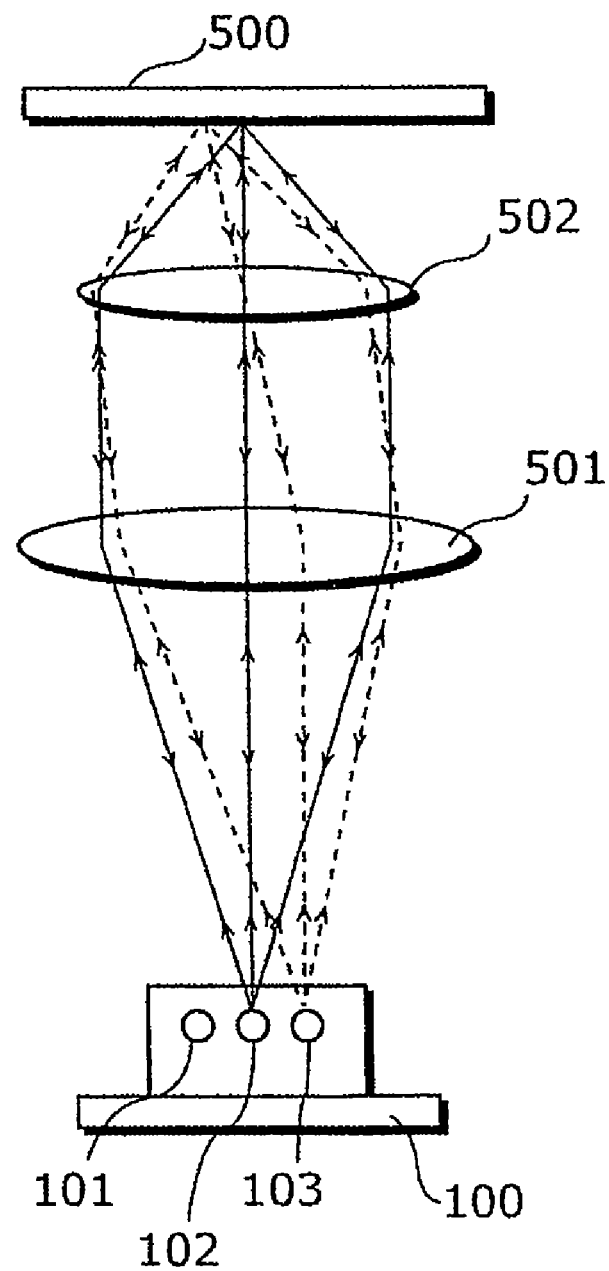
FIG. 1 is a configuration diagram showing a conventional optical pickup.
Figure 2A:
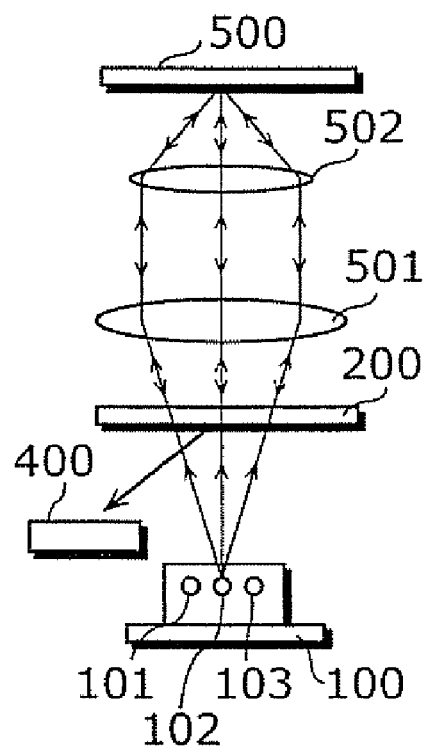
FIG. 2A is a configuration diagram showing an optical pickup apparatus according to the first embodiment of the present invention.
Figure 2A:
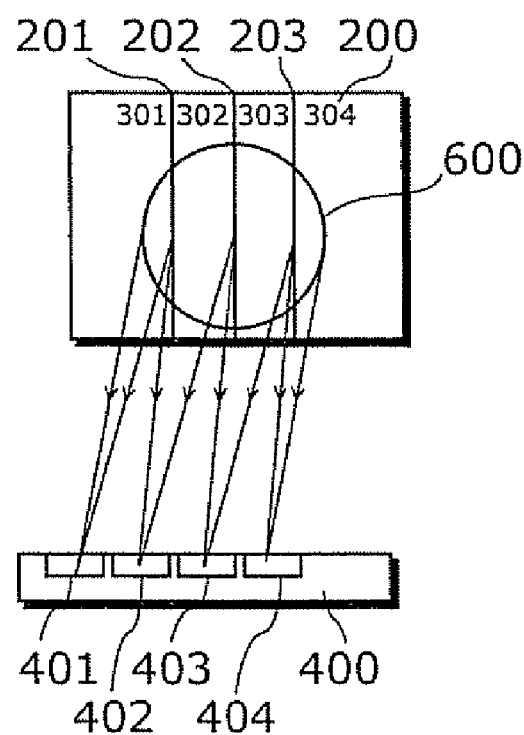
Figure 2B:
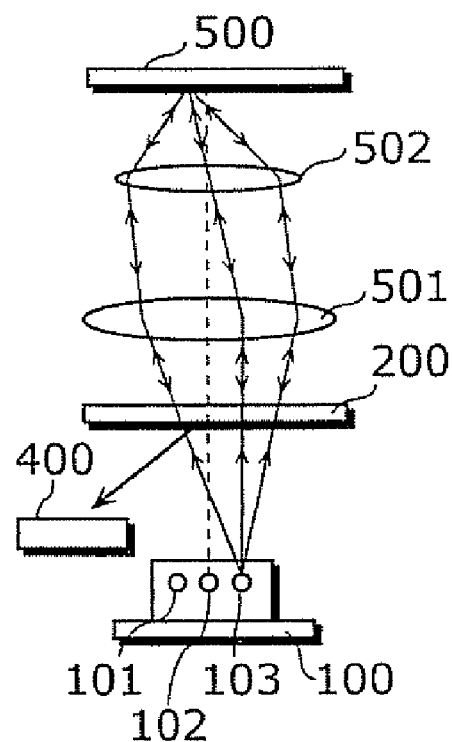
FIG. 2B is a configuration diagram showing an optical pickup apparatus according to the first embodiment of the present invention.
Figure 2B:
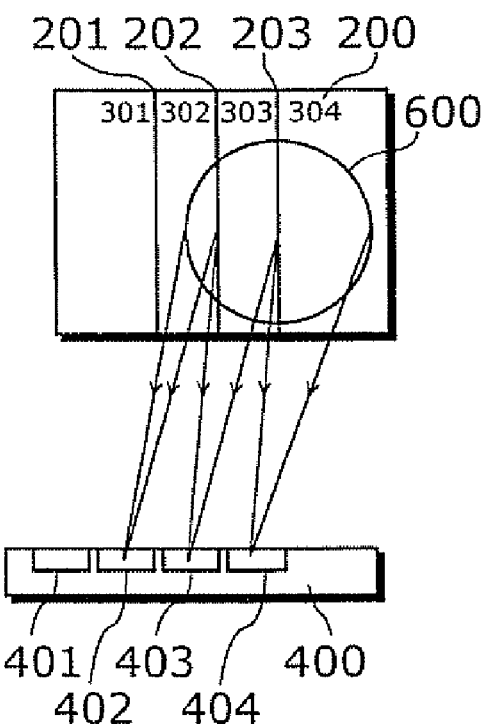
Figure 2C:
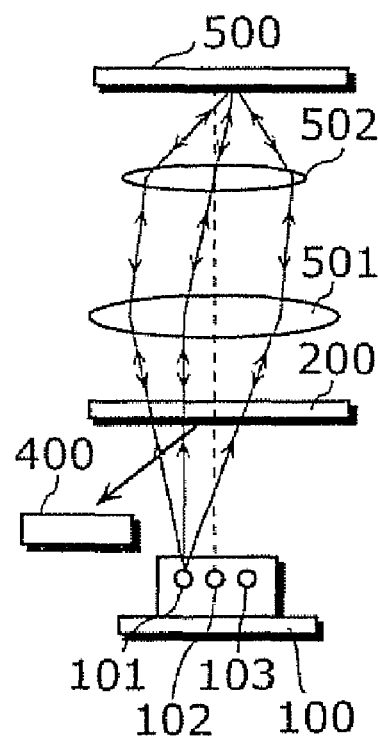
FIG. 2C is a configuration diagram showing an optical pickup apparatus according to the first embodiment of the present invention.
Figure 2C:
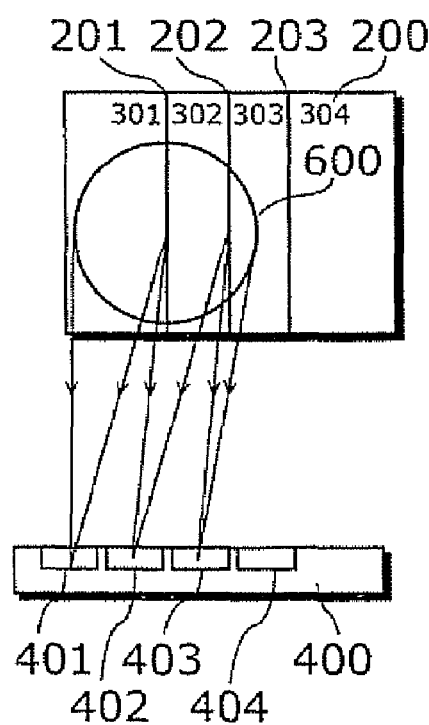

FIGS. 2A, 2B, and 2C are configuration diagrams of an optical pickup apparatus according to the first embodiment of the present invention, and also show an enlarged view of a hologram area. The optical pickup device is configured of: a semiconductor laser device 100, which has three light sources; a hologram optical element 200; a light receiving element 400; an optical disc 500; a collimate lens 501; and an objective lens 502. The optical pickup device serves to retrieve information from the optical disc 500 and record to the optical disc. The hologram optical element 500 has division lines 201, 202, and 203 in positions where optical axes of each reflected light, the light being light beams from each laser device 101, 102, and 103, intersect with the hologram optical element 200.

In FIGS. 2A, 2B, and 2C, the light beams outgoing from the semiconductor laser device 100, which includes the three light sources 101, 102, and 103, is connected to the optical disc through a condenser optical system configured of the collimate lens 501 and the objective lens 502. The optical system has the optical axis aligned with the central light source 102, from among the three light sources in the semiconductor laser device 100.

FIG. 2A shows the case where the light source 102 is emitting light, with the light beams connected to and reflected from the optical disc following the same path, and arriving at the hologram 200. At this time, it can be seen that the division line 202 divides the right and left sides of the hologram 200 into two almost equal divisions.

In such a state, the light beams projected into each of hologram areas 301 to 304, as divided by the three division lines, are diffracted or condensed onto each detection area 401 to 404 of the light receiving element 400. Through this, it is possible to detect a light signal at each area as an electrical signal, and can be calculated and detected as:

Differential signal=(401+402)−(403+404)

FIG. 2B shows a state in which the light source 103 is emitting light. A division line 203 exists on the hologram surface so as to correspond to the light source 103. The light beam emitted from the light source 103 makes one trip around on the path shown in the diagram, and in the present configuration, is divided almost equally in two by the division line 203.

As shown in FIG. 2B, the light beam is projected so as to span the areas 302, 303, and 304 of the hologram surface, and is led to the light receiving elements 402, 403, and 404 by a hologram pattern in each area.

At this time, the differential signal can be detected with:

Differential signal=(402+403)−(404)

FIG. 2C shows a state in which the light source 101 is emitting light, but as this is simply a right-left inversion of the state shown in FIG. 2B, descriptions are hereby omitted.

According to the present embodiment as described above, it is possible, in an optical pickup apparatus with a plurality of light sources arranged, to detect a signal divided equally in two regardless of which light source is operating, and possible to stably detect a necessary signal, such as a tracking signal and an address signal.

Note that a configuration which features two or four or more light emission points, or in which the center of the optical system is set in a light source aside from the central light source, can be considered. It goes without saying that the same effects as described above can also be obtained in such a configuration. This also applies to the embodiments described hereafter.

In addition, the present configuration allows a stable signal to be obtained in the case where a plurality of semiconductor laser light sources exists, but even in the case where wavelengths of the plurality of semiconductor lasers differ, the case where light output differs, or in a configuration where the same laser has differing light emission points, the present configuration has the same effects. This characteristic also applies to the embodiments described hereafter.

In addition, each area of the hologram pattern is designed to provide the projected light beam with a desired aberration, and further divisions within each area may occur at that time. However, with the present embodiment, it is possible to obtain the same effect as long as the configuration has division lines existing in an interval approximate to the interval of the light emission point. It goes without saying that the same effects can be obtained even if there are more division lines. This also applies to the embodiments described hereafter.

Second Embodiment

Next, an optical pickup device according to the second embodiment of the present invention is described.

Figure 3A:
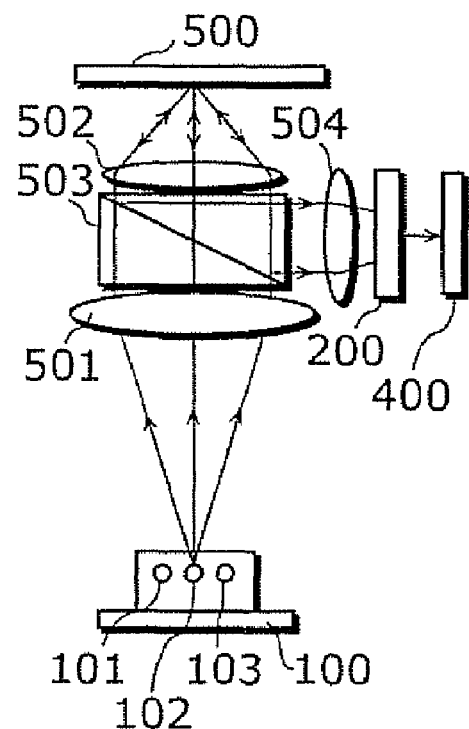
FIG. 3A is a configuration diagram showing an optical pickup apparatus according to the second embodiment of the present invention.
Figure 3A:
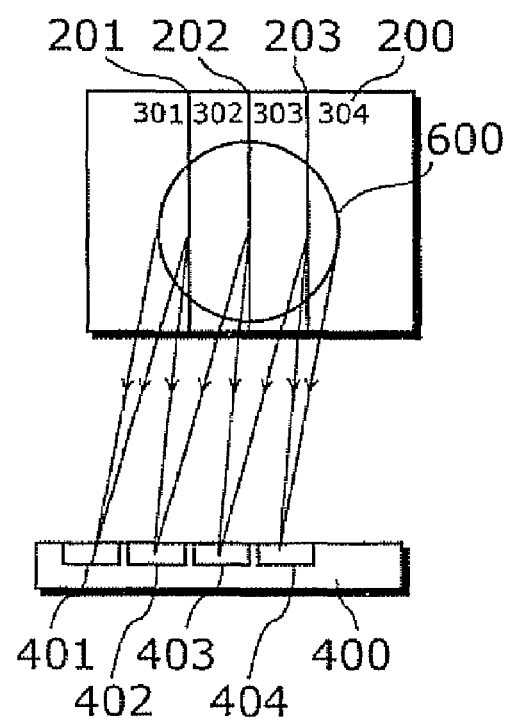
Figure 3B:
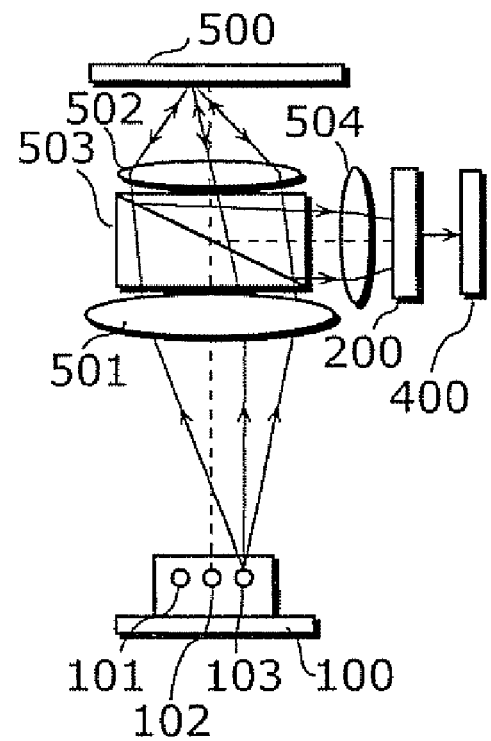
FIG. 3B is a configuration diagram showing an optical pickup apparatus according to the second embodiment of the present invention.
Figure 3B:
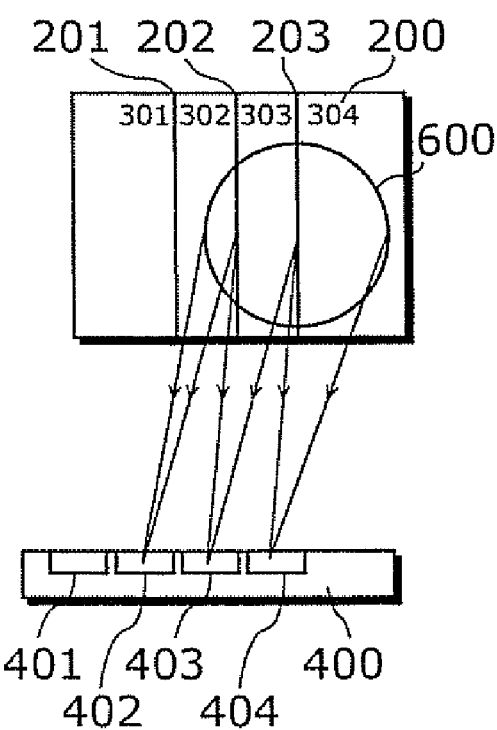
Figure 3C:
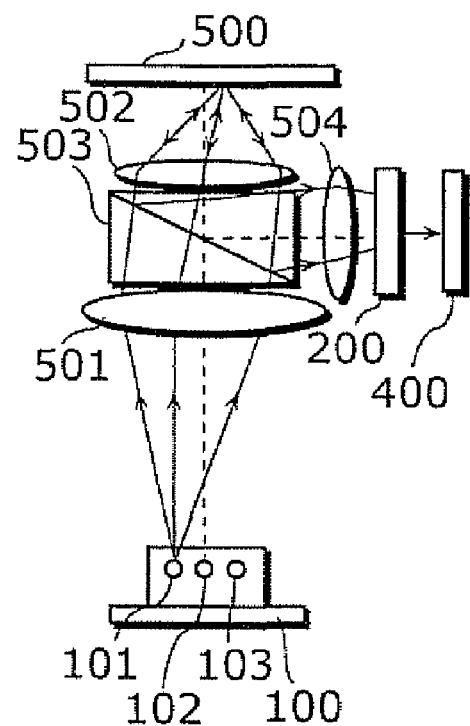
FIG. 3C is a configuration diagram showing an optical pickup apparatus according to the second embodiment of the present invention.
Figure 3C:
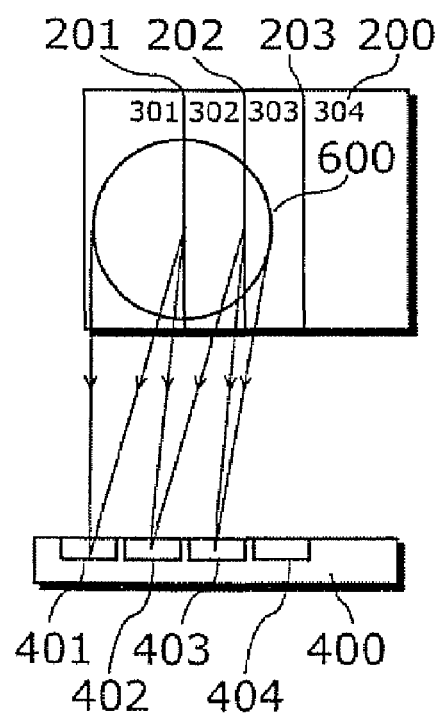

FIGS. 3A, 3B, and 3C are configuration diagrams of an optical pickup apparatus according to the second embodiment of the present invention, and also show an enlarged view of a hologram area.

The optical pickup apparatus according to the second embodiment has added a beam splitter 503 and a detection lens 504 to the optical pickup apparatus of the first embodiment. Structures identical to those in the optical pickup apparatus of the first embodiment are given identical numbers, and descriptions are omitted. A hologram optical element 500 has division lines 201, 202, and 203 in positions where optical axes of each reflected light refracted by the beam splitter 503, the light being light beams from each laser device 101, 102, and 103, intersect with the hologram optical element 200.

In FIGS. 3A, 3B, and 3C, a state is shown in which a light beam emitted from a semiconductor laser device 100, which includes three light sources 101, 102, and 103, is connected to the optical disc through a condenser optical system configured of a collimate lens 501 and an objective lens 502. As an example, the optical system has an optical axis aligned with the central light source 102, from among the three light sources of the semiconductor laser device 100.

FIG. 3A shows the case where the light source 102 is emitting light. The light beam connected to and reflected from the optical disc follows the same path, is split by the light beam splitter 503, is then condensed onto a detection lens 504, and in that path, arrives at the hologram 200. At this time, it can be seen that the division line 202 divides the right and left sides of the hologram 200 into two almost equal divisions.

In such a state, the light beams projected into each of hologram areas 301 to 304, as divided by the three division lines, are diffracted or condensed onto each detection area 401 to 404 of a light receiving element 400. Through this, it is possible to detect a light signal at each area as an electrical signal, and can be calculated and detected as:

Differential signal=(401+402)−(403+404)

FIG. 3B shows a state in which the light source 103 is emitting light. At this time, by making an interval when the light beam emitted from the plurality of light sources is condensed onto the light receiving element 400 by the detection lens the same as an interval of the division lines on the hologram surface, the division line 203 exists on the surface of the hologram when the light beam emitted from the light source 103, and thus it is possible to divide the light beam almost equally in two with the division line 203.

More specifically, as shown in FIG. 3B, the light beam is projected so as to span areas 302, 303, and 304 of the hologram surface, and is led to the light receiving elements 402, 403, and 404 by a hologram pattern in each area.

At this time, the differential signal can be detected with:

Differential signal=(402+403)−(404)

FIG. 3C shows a state in which the light source 101 is emitting light, but as this is simply a right-left inversion of the state shown in FIG. 3B, descriptions are hereby omitted.

According to the present embodiment as described above, it is possible, in an optical pickup apparatus with a plurality of light sources arranged, to detect a signal divided equally in two regardless of which light source is operating, and possible to stably detect a necessary signal, such as a tracking signal and an address signal.

Third Embodiment

Next, an optical pickup device according to the second embodiment of the present invention is described.

Figure 4A:
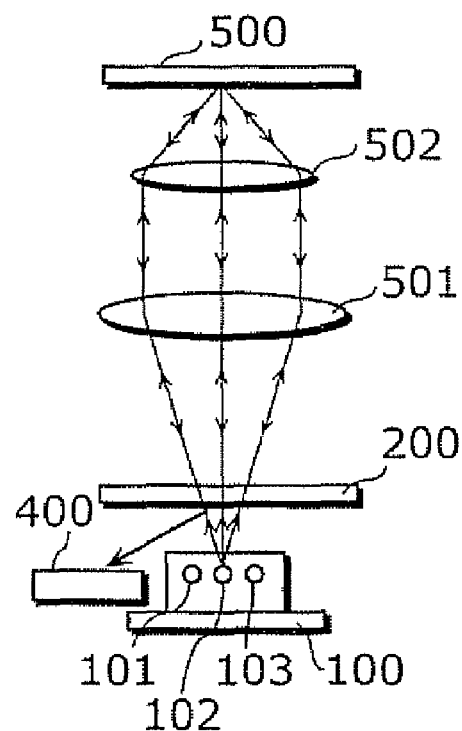
FIG. 4A is a configuration diagram showing an optical pickup apparatus according to the third embodiment of the present invention.
Figure 4A:
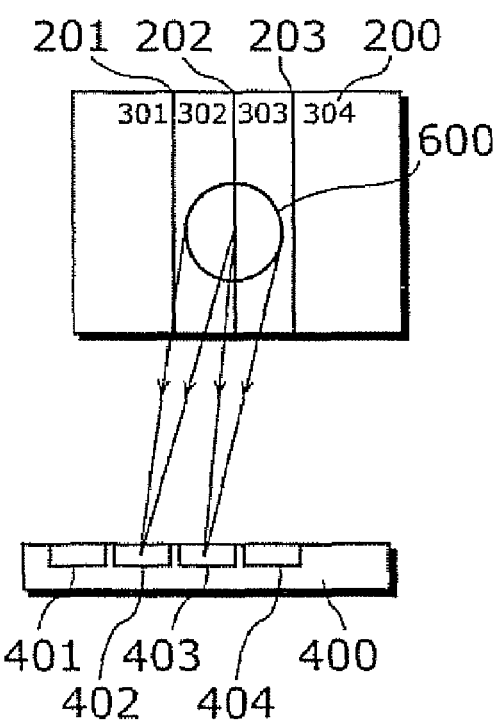
Figure 4B:
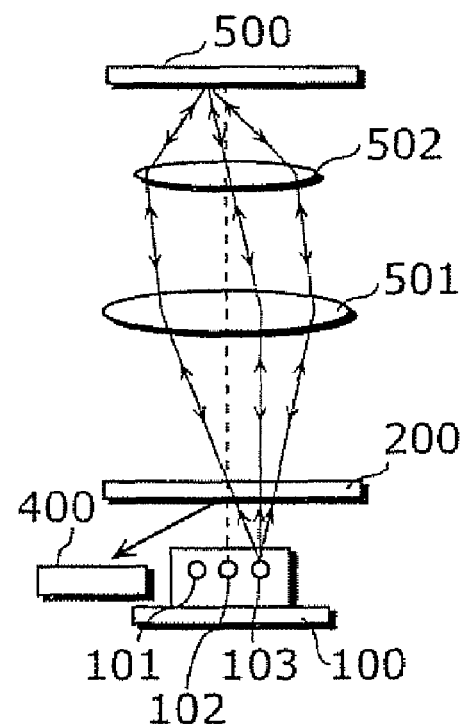
FIG. 4B is a configuration diagram showing an optical pickup apparatus according to the third embodiment of the present invention.
Figure 4B:
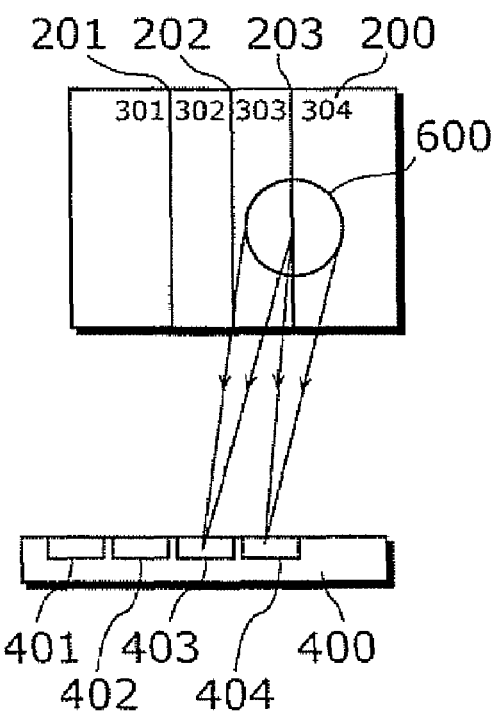
Figure 4C:
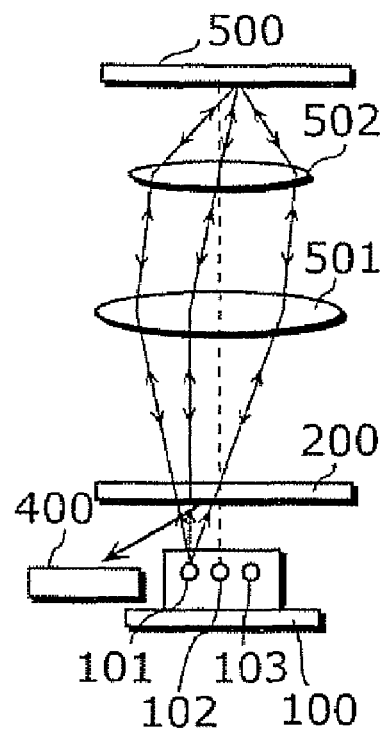
FIG. 4C is a configuration diagram showing an optical pickup apparatus according to the third embodiment of the present invention.
Figure 4C:
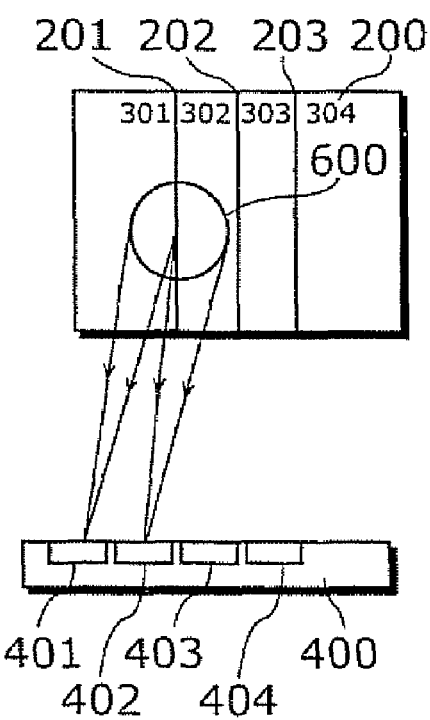
Figure 5:
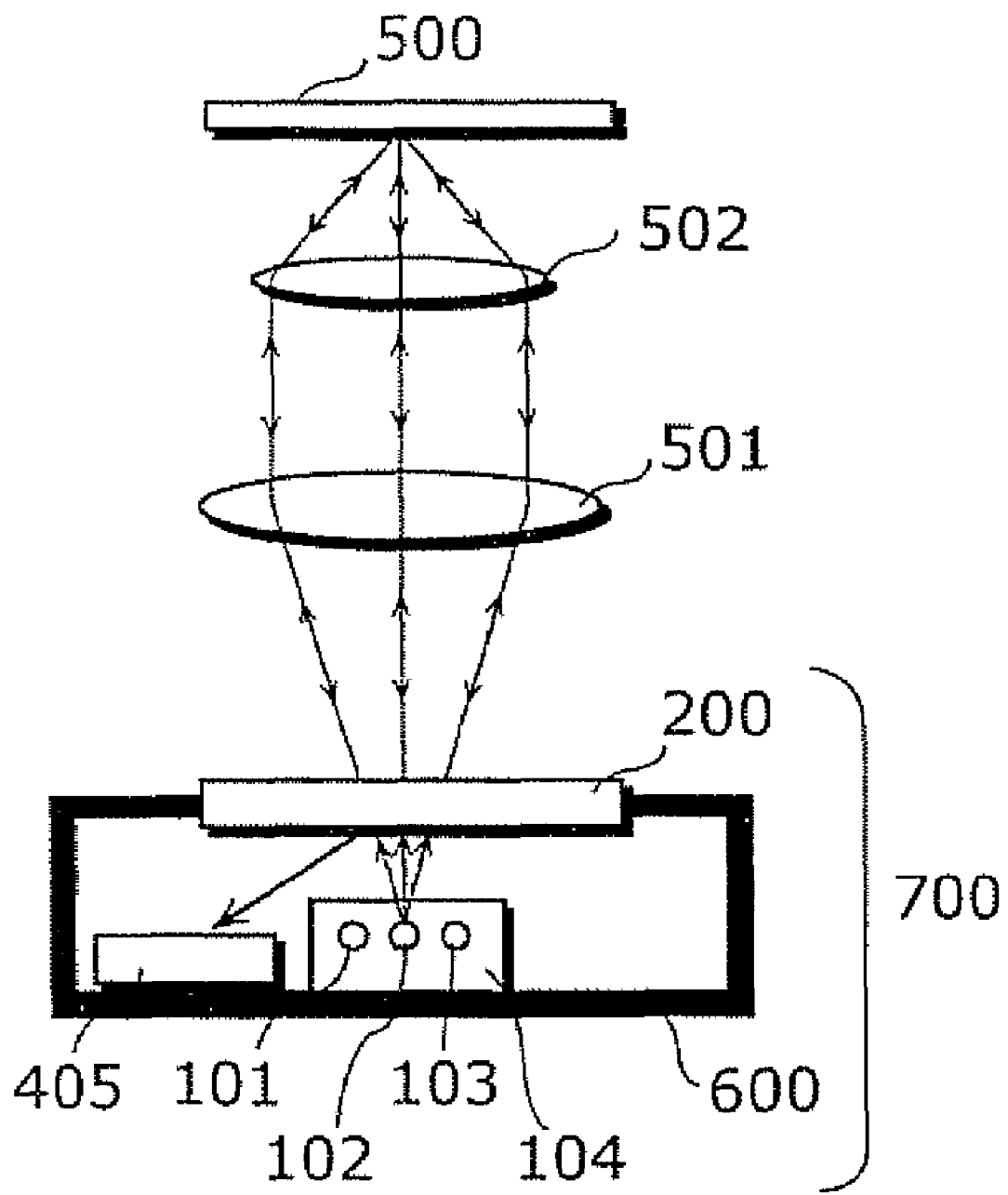
FIG. 5 is a configuration diagram showing an optical pickup apparatus according to the third embodiment of the present invention and an integrated unit apparatus.

FIGS. 4A, 4B, and 4C are configuration diagrams of an optical pickup apparatus according to the third embodiment of the present invention, and also show an enlarged view of a hologram area. Structural elements in the present embodiment that are identical to those in the optical pickup apparatus of the first embodiment are given identical numbers, and descriptions are omitted.

In FIGS. 4A, 4B, and 4C, a state is shown in which a light beam emitted from a semiconductor laser device 100, which includes three light sources 101, 102, and 103, is connected to the optical disc through a condenser optical system configured of a collimate lens 501 and an objective lens 502. As an example, the optical system has an optical axis aligned with the central light source 102, from among the three light sources of the semiconductor laser device 100.

In the present embodiment, a hologram element 200 exists within 3 mm of the light emission point, and by arranging the hologram optical element in areas so that paths of a plurality of light beams do not overlap when approaching a condenser optical system, it is possible to clearly divide the light reflected from the optical disc in two parts against the hologram division lines, and possible to detect a signal of higher accuracy which is not affected by the properties that vary depending on the area of the hologram.

FIG. 4A shows the case where the light source 102 is emitting light. The light beam connected to and reflected from the optical disc follows the same path and arrives at the hologram 200. At this time, it can be seen that the hologram 200 exists within 3 mm of the light emission point, and the light beam is projected onto the hologram surface in a smaller spot than the state in FIG. 2A, as well as being almost equally divided in two by the division line 202.

Therefore, this beam is divided only by the division line 202, and a half spot is projected onto each hologram area 302 and 303. This projected light beam is diffracted or condensed onto each detection area 401 to 404 of a light receiving element 400. Through this, it is possible to detect a light signal at each area as an electrical signal, and can be calculated and detected, with low computational load, as:

Differential signal=(401+402)−(403+404)

In this case, both the error of the circuit and the number itself of divisions of the hologram spanned by the beam spot are reduced, reducing the influence of optical noise, thus making it possible to detect a more highly-accurate signal.

FIG. 4B shows a state in which the light source 103 is emitting light. A division line 203 exists on the hologram surface so as to correspond to the light source 103. The light beam emitted from the light source 103 makes one trip around on the path shown in the diagram, and in the present configuration, is divided almost equally in two by the division line 203.

As shown in FIG. 4B, the light beam is projected so as to span only the areas 303 and 304 of the hologram surface, and is led to the light receiving elements 403 and 404 by a hologram pattern in each area.

At this time, it is possible to detect the differential signal as

Differential signal=403−404

This, as above, makes it possible to detect a highly-accurate signal with little optical noise, at a low computational load.

FIG. 4C shows a state in which the light source 101 is emitting light, but as this is simply a right-left inversion of the state shown in FIG. 4B, descriptions are hereby omitted.

According to the present embodiment as described above, it is possible, in an optical pickup apparatus with a plurality of light sources arranged, to detect a signal divided equally in two regardless of which light source is operating, and possible to stably detect a necessary signal with high accuracy, such as a tracking signal and an address signal.

Note that in the optical pickup apparatus with a configuration such as that of the second embodiment, it is possible to detect a highly-accurate signal even by causing the hologram 200 to exist within 3 mm of the light receiving element 400.

In addition, as shown in FIG. 51 by integrating the hologram optical element 200 in the present configuration, a semiconductor laser chip 104, and a light receiving element chip 405 into a single package 600, a more optically stable optical pickup apparatus can be obtained, and an integrated unit 700, applicable in a variety of optical pickup apparatuses, can be obtained.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The optical pickup apparatus according to the present invention can, in the case where a plurality of light sources exists, detect a desired bilaterally-divided signal when any of the light beams are operating, and can detect a stable servo address, and other various types of signals. Therefore, the present invention is applicable as an optical pickup apparatus which records/reproduces many optical discs, such as CD, DVD, next-generation high-density discs, and so on.

What is claimed is:

1. An optical pickup apparatus which performs recording/reproduction or deletion of information on an optical recording medium, said apparatus comprising:
    a light-emitting unit, in which n sources are integrated, n being equal to or greater than 2;
    a light-condensing unit operable to condense, onto the optical recording medium, each light emitted by said light-emitting unit;
    an optical unit which includes a plurality of outgoing light areas each outgoing light area divides a corresponding one of lights condensed and reflected from the optical recording medium; and
    a light-receiving unit operable to detect the divided reflected light,
    wherein said optical unit includes n division lines each of which extends in a tangential direction of the optical recording medium with respect to a corresponding one of the light sources, and each of which serves as a boundary between outgoing light areas at a position where the division line intersects an optical axis of the reflected light,
    said optical unit is divided into n+1 light outgoing areas by the n division lines, and
    said light-receiving unit includes n+1 received light detection areas each of which independently detects the reflected light divided by each of the n+1 light outgoing areas, and is operable to determine, for each light source, a differential signal based on a difference between a signal from a received light detection area which detects a light divided by a light outgoing area included in one of two sets of the light outgoing areas and a signal from a received light detection area which detects a light divided by a light outgoing area included in the other one of the two sets of the light outgoing areas, the two sets of the light outgoing areas being located at a different side of the division lines corresponding to each light source.

2. The optical pickup apparatus according to claim 1, wherein said optical unit is a hologram optical element.

3. The optical pickup apparatus according to claim 1, wherein the n division lines of said optical unit are arranged at an interval equal to an interval between the light sources within said light-emitting unit, and
    each reflected light associated with the corresponding one of the light sources is incident on only two areas adjacent to each division line associated with the corresponding one of the light sources.

4. The optical pickup apparatus according to claim 3, wherein said optical unit is located between said light-emitting unit and said condensing unit.

5. The optical pickup apparatus according to claim 1, further comprising:
    a diffraction unit operable to diffract each light reflected from the optical recording medium, the light being emitted from the corresponding one of the light sources, and to condense the diffracted light onto said light receiving unit,
    wherein each optical axis is a corresponding one of optical axes of reflected lights diffracted by said diffraction unit.

6. The optical pickup apparatus according to claim 5, wherein said optical unit is located between said light receiving unit and said diffraction unit.

7. An optical pickup apparatus which performs recording/reproduction or deletion of information on an optical recording medium, said apparatus comprising:
- a light-emitting unit, in which at least two light sources are integrated; and
- an optical unit which is divided into a plurality of outgoing light areas by a plurality of division lines which intersect with optical axes of each light reflected from the optical recording medium, the light being emitted from each of the light sources, and the plurality of outgoing light areas dividing reflected light of each of the light sources, wherein the plurality of division lines are spaced at an interval equal to an interval of the light sources within said light-emitting unit.

* * * * *

UNITED STATES PATENT AND TRADEMARK OFFICE
CERTIFICATE OF CORRECTION

PATENT NO.       : 7,613,097 B2
APPLICATION NO.  : 11/275701
DATED            : November 3, 2009
INVENTOR(S)      : Nakanishi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 847 days.

Signed and Sealed this

Nineteenth Day of October, 2010

David J. Kappos
*Director of the United States Patent and Trademark Office*